(No Model.)

C. W. PAYNE.
HEATER AND COOLER.

No. 250,836. Patented Dec. 13, 1881.

WITNESSES:
Thos. Houghton.
Solon C. Kemon

INVENTOR:
C. W. Payne
BY
ATTORNEYS.

UNITED STATES PATENT OFFICE.

CHARLES W. PAYNE, OF CENTER, ARKANSAS.

HEATER AND COOLER.

SPECIFICATION forming part of Letters Patent No. 250,836, dated December 13, 1881.

Application filed July 15, 1881. (No model.)

*To all whom it may concern:*

Be it known that I, CHARLES WESLEY PAYNE, of Center, in the county of Sharp and State of Arkansas, have invented a new and useful Improvement in Heaters and Coolers; and I do hereby declare that the following is a full, clear, and exact description of the same, reference being had to the accompanying drawings, forming part of this specification, in which—

Figure 1:
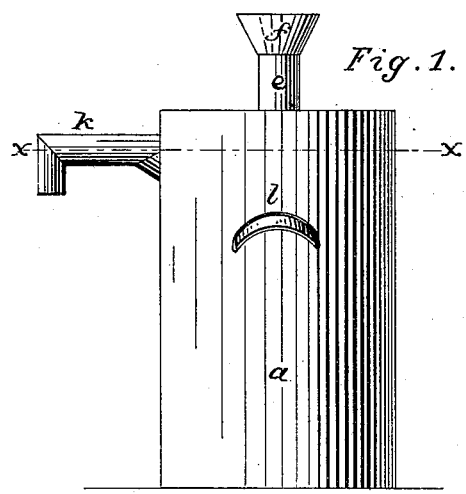
Figure 2:
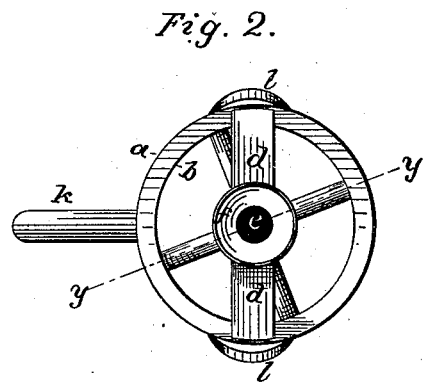
Figure 3:
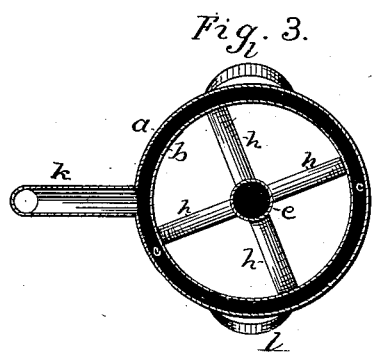
Figure 4:
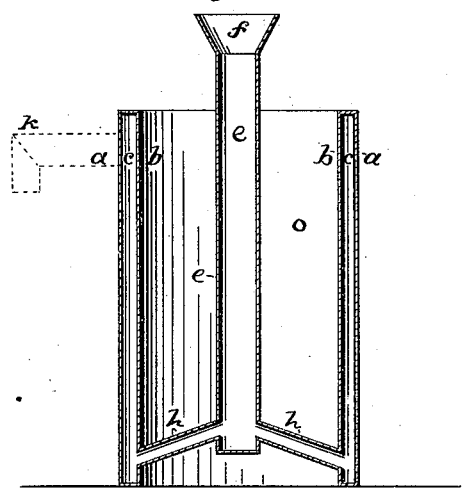

Figure 1 is a side elevation of my improved heater or cooler. Fig. 2 is a cross-section of the same in the line $xx$, Fig. 1. Fig. 3 is a top view; and Fig. 4 is a vertical central section in the line $yy$, Fig. 2.

The object of my invention is to heat beer, milk, or other liquids in cold weather, or cool liquids in hot weather, by partly immersing in said liquids a vessel of peculiar construction, through which a current of hot water, or steam, or cold water is made to circulate and be discharged therefrom without coming in contact with the liquid to be heated or cooled, as hereinafter more fully set forth.

In the accompanying drawings, $a$ represents an outer metallic cylinder, and $b$ an inner metallic cylinder, of less diameter than the outer cylinder and concentric therewith, leaving an annular space, $c$, between the cylinders, closed at its upper and lower ends.

$d$ represents a support passing diametrically across the upper end of the cylinders, and provided with a central orifice, through which passes a pipe, $e$, open at its upper end, projecting above the cylinders, and provided with a flaring or funnel-shaped mouth, $f$. The pipe $e$ is arranged in the axis of the cylinders, is closed at its lower end, and extends nearly to the bottom of the cylinders.

$h\ h$ represent inclined pipes opening into the pipe $e$ near its lower end, and radiating therefrom in different directions, and each communicating at a different point with the space $c$ between the cylinders. $k$ represents an angular eduction-pipe, communicating at its inner end with the space $c$ between the cylinders.

$l\ l$ represent handles secured to the outer cylinder and lying opposite each other.

In practice, in heating beer, milk, or other liquids in cold weather to raise their temperature, steam may be introduced into a water-tank by a pipe connected with a steam-boiler to heat the water in the tank to any desired temperature. The hot water from the tank is then conducted by hose or a pipe from the tank into the tube or pipe $e$, the heater being placed in the liquid to be heated, its base resting on the bottom of the liquid-receptacle. The hot water passes down the central pipe $e$, thence through the inclined pipes $h\ h$ into the space between the cylinders, and thence through the angular eduction-pipe $k$ into a trough or other receptacle. By this construction the hot water, being conducted in a tortuous course through the heater, quickly heats the latter, which imparts its heat to the liquid, in which it is partly immersed.

In hot weather, when it is desired to cool beer, milk, or other liquid, the vessel or cooler is partly immersed in the liquid to be cooled, and cold water is introduced into the pipe $e$ and made to circulate through the vessel in the same manner as described for the hot water.

When the vessel is used as a heater steam from the boiler may be made to circulate through the vessel or heater, if desired, in lieu of hot water.

I am aware of the Patent of I. Link for a liquid-cooler, dated December 15, 1868, No. 84,888, intended, principally, to cool beer in saloons, in which the beer to be cooled is introduced into a central chamber, and thence passes down radial inclined pipes into an annular chamber, and thence up a bent pipe provided with a faucet, from which it is drawn as desired. In Link's construction the central chamber, inclined radial pipes, annular chamber, and bent draft-pipe are all arranged in a vessel with a bottom, in which ice is introduced to cool the beer, and it is not designed to be partly immersed in the liquid to be cooled or heated contained in a suitable receptacle, as in my invention. I dispense with the outer vessel that Link employs and its bottom, and cause steam or hot and cold water to circulate through the apparatus and heat or cool it, which heats or cools the liquid surrounding it and inside of it, the cylinders having no bottom. My invention is designed particularly to be employed in distilleries before and during fermentation, and takes up much less room than Link's invention, which I hereby disclaim.

I claim as my invention—

The combination, with a receptacle containing the liquid to be heated or cooled, of a pipe connected with a steam-boiler or cold-water reservoir, the concentric cylinders $a$ $b$, connected together at their ends, with a space, $c$, between them, the cylinder $b$ being open at both ends, the central pipe, $e$, radial pipes $h$, and eduction-pipe $k$, adapted to conduct the steam or cold water outside of the liquid-receptacle, substantially as described.

CHARLES WESLEY PAYNE.

Witnesses:
GREEN DUPUY,
HENRY C. WEBB.